United States Patent Office 3,397,863
Patented Aug. 20, 1968

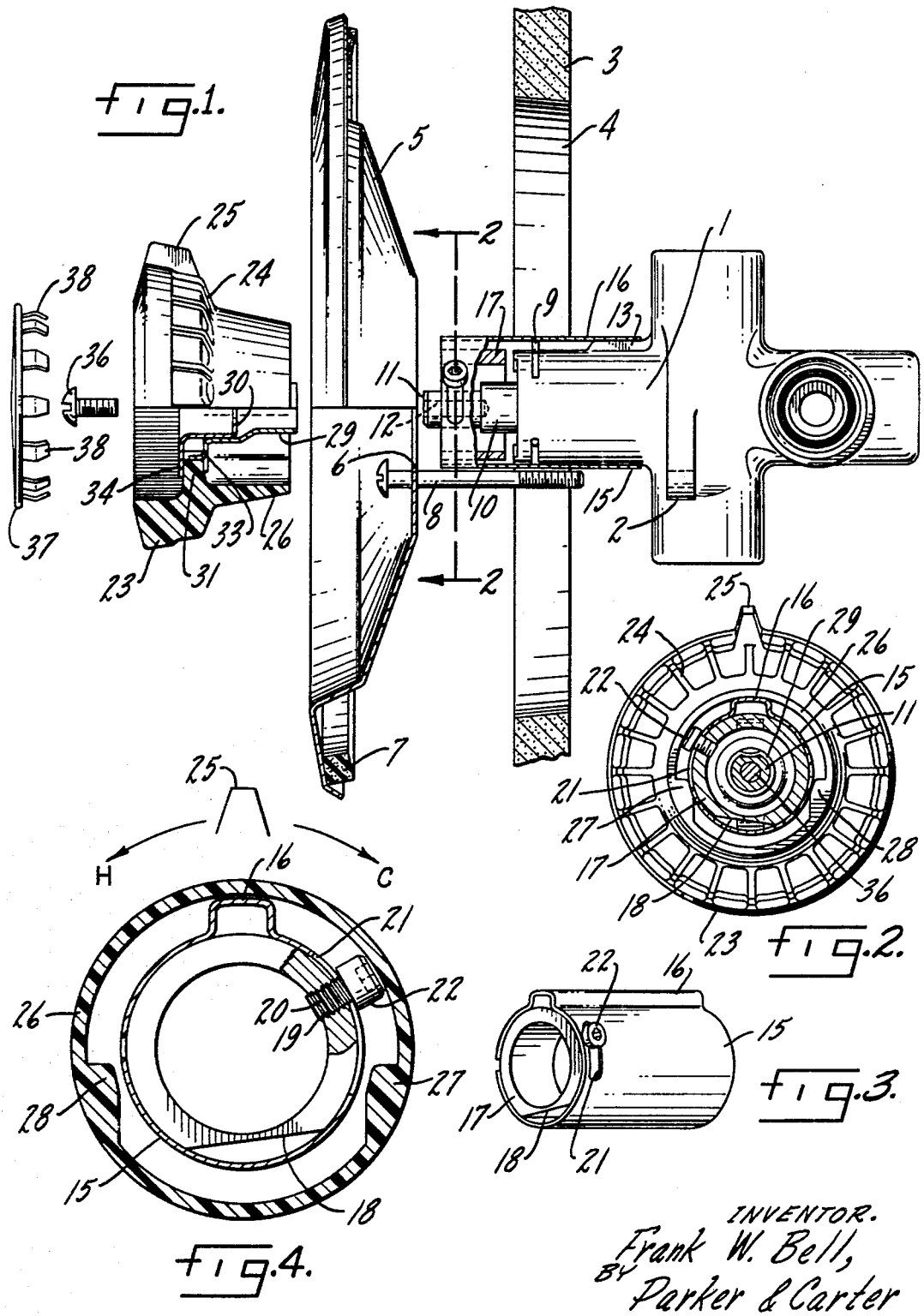

3,397,863
ADJUSTABLE STOP TUBE
Frank W. Bell, Avon, Ohio, assignor to Standard Screw Company, Bellwood, Ill., a corporation of New Jersey
Filed May 18, 1966, Ser. No. 550,987
6 Claims. (Cl. 251—285)

This invention relates to a mixing faucet in which hot and cold water is mixed and is discharged preferably through a single discharge.

The hot and cold water are furnished to a mixing valve and in that valve, the details of which form no part of this invention, the hot and cold water are mixed and the volume is controlled. The valve may be adjusted to close a faucet within which it is located or to open it and it may also be adjusted to vary the temperature of the mixture. One such valve is shown in U.S. Patent Re. 25,920, issued Nov. 30, 1965. Although the present invention is not limited in its application to use with that precise valve cartridge assembly, the structure illustrated herewith is shown as combined with such a valve.

One object of this invention is to provide adjustable stop means applicable to a mixing faucet which stop limits the adjustment of the valve in the direction of the "hot" discharge. It prevents, in one position of adjustment, the movement of the faucet to a position which will produce excessively hot temperatures. This invention has therefore as one object the provision of an adjustable safety stop member to prevent accidental or deliberate moving of the valve to a position which will permit the discharge from the faucet in which the valve is located of water which is dangerously hot.

Another object is to provide a definite stop by means of which the temperature of a mixed water discharge is automatically determined without careful inspection or manipulation. Where the valve is primarily used repeatedly by the same user, it may be desirable to the user to have water discharged always at a predetermined temperature. For that purpose, the stop of this invention may be adjusted to assure this result. Once it is adjusted, the user has only to move the valve handle until its movement is stopped by the stop and he will get water at the chosen temperature.

Obviously another user may choose a different temperature and change the setting of the stop to accord with the temperature which he wishes. It is therefore another object of the invention to provide a stop by means of which a temperature controlling valve in a water faucet may be assured of a suitable position of limit. That position of limit is determined by the user and is adjusted to suit his convenience.

The invention is illustrated diagrammatically in the accompanying drawings wherein:

FIGURE 1 is an exploded sectional view with parts in elevation,

FIGURE 2 is a transverse section taken at line 2—2 of FIGURE 1,

FIGURE 3 is a perspective of the adjustable stop tube, and

FIGURE 4 is an end elevation on an enlarged scale showing diagrammatically the position of the hot and cold direction markers and the pointer on the handle.

Like numerals will be used to designate like parts in the following description of the invention.

As shown, the adjustable stop tube of this invention is mounted within a housing 1. The housing is fixed within or upon a wall and is a permanent part of a plumbing system. One or more ears 2 may be formed on the housing for attachment to portions of the wall. A finishing wall, shown at 3, is provided with a perforation or opening 4 through which the faucet may be installed and serviced.

The opening is closed by an ornamental plate 5 which is provided with a circular opening 6 and may include a rubber or other packing member 7 adapted to fit tightly against the outer surface of the wall 3. The plate 5 is held removably in position by one or more screws 8 threaded into the ears 2. "Hot" and "Cold" markers are formed on the outer surface of the plate 5 at any convenient portion of that surface and they are indicated diagrammatically in FIGURE 4.

The faucet assembly includes a valve which is held within the housing 1 by a clip 9 or otherwise. The engages the housing 1 and engages also the valve assembly of the faucet.

Since the details of the valve form no essential part of the present invention, they are not shown. Reference has been made above to a patent covering the details of the valve itself.

The valve includes a stem 10 which projects as indicated in FIGURE 1 and is provided with a portion 11 of reduced diameter and preferably angular cross section to receive a handle. The portion portion 11 is provided with a threaded depression 12 to receive a handle fastener.

The housing is provided with a raised, longitudinally extended portion 13.

A stop tube fits, as shown particularly in FIGURES 1 and 2, over an outwardly extending portion of the housing and engages the raised portion 13 in a channel 16 formed in the tube 15.

Positioned in the open end of the stop tube is a bushing 17 which is generally cylindrical or ringlike in shape and is flat at 18. The bushing is provided with a threaded perforation or depression 19 within which a stop screw 20 is threaded. The stop screw passes through a slot 21 in the stop sleeve 15. While the stop screw may be of any shape for screwing it into and out of place, it has in the particular form shown a socket head 22.

A variety of different sorts of handles may be applied to the valve stem 11. The one shown is suitable for this installation. It includes a handle 23 provided with a laterally extending, outwardly inclined portion 24 and a pointer or indicator 25. The handle is hollow and is provided with a generally tubular portion 26. Internally the tubular portion is provided with a plurality of stop portions 27 and 28.

In the particular form here shown, the handle includes two interfitting tubular portions which engage the stem of the valve mechanism. There is thus an exterior tubular portion 29 and an interior tubular portion 30 tightly within it. Each of these tubular portions is provided with members which engage the inwardly directed flange 31 of the handle. As shown in FIGURE 1, one tube 29 has flange engaging parts 33 and the tube 30 has flange engaging parts 34. When the handle is assembled as shown in FIGURE 1 and the plate 5 has been moved inwardly to engage the surface of the wall 3, the handle may then be fitted to the valve stem 11 by sliding the tube 29 over the exposed end of the stem 11.

After the handle is in position upon the valve stem, the screw 36 is engaged in the threaded depression 12 of the stem 11 and it retains the handle in place on the stem.

The open end of the handle is closed by a closing plate 37 which may be ornamental if desired and which is provided with spring legs 38 which engage the handle and hold the plate removably in place therein.

The use and operation of the invention are as follows:

When the parts are assembled, the screw 20 is moved in the slot 21 to a position suitable to the user of the valve and is tightened. Thereafter when the valve is used and the valve stem is rotated by the handle in the "hot" direction, the stop 27 on the handle end strikes the stop screw head 22 and further movement in the "hot" direction will be prevented.

Obviously the stop screw may be positioned at any point within the length of the slot 21.

Rotation of the handle in the opposite direction, or cold direction, may be carried out until the stop 28 strikes the raised portion 16 of the stop tube 15. This movement of the handle and hence of the valve stem in the cold direction is preferably not provided with an adjustable stop and is not shown in the present installation.

What is claimed is:

1. In combination with a faucet including a rotary stem, a handle fixed on said stem and by which it may be rotated, a plurality of stops on said handle and an adjustable stop means fixed in relation to said stem and said handle, said adjustable stop means including a stop sleeve, a stop vane on said sleeve, means for anchoring said sleeve, and an adjustable stop on said sleeve, said sleeve having a slot, there being a fastener extending through said slot and adapted to be secured in adjusted position along said slot, said fastener comprising said adjustable stops, one of said stops on said handle being positioned to contact said stop vane and the other of said stops on said handle being positioned to contact said adjustable stop.

2. The device of claim 1 further including a vane engaging part adjacent said faucet.

3. The device of claim 1 further characterized in that said adjustable stop comprises a bushing within said sleeve.

4. The device of claim 3 further characterized in that said bushing has a cutaway portion.

5. The device of claim 4 further characterized by the fact that said slot is positioned circumferentially.

6. The device of claim 1 further characterized by the fact that said slot is positioned circumferentially.

References Cited

UNITED STATES PATENTS

| | | | |
|---|---|---|---|
| 1,136,276 | 4/1915 | Scaife | 251—285 X |
| 1,220,145 | 3/1917 | Lindemer | 251—285 X |
| 1,943,865 | 1/1934 | Hennessey | 251—285 X |
| 2,030,150 | 2/1936 | Mueller | 251—285 |
| 2,043,971 | 6/1936 | Marvin | 251—285 |
| 2,237,469 | 4/1941 | Bender | 251—285 X |
| 2,475,840 | 7/1949 | Johnson | 251—285 |

FOREIGN PATENTS

| | | |
|---|---|---|
| 852,217 | 10/1939 | France. |
| 206,316 | 2/1909 | Germany. |

M. CARY NELSON, *Primary Examiner.*

R. C. MILLER, *Assistant Examiner.*